(12) United States Patent
Tanaka

(10) Patent No.: US 6,557,839 B2
(45) Date of Patent: May 6, 2003

(54) FLUID-FILLED VIBRATION DAMPING DEVICE AND METHOD OF PRODUCING THE SAME

(75) Inventor: Eiji Tanaka, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 10/004,658

(22) Filed: Dec. 5, 2001

(65) Prior Publication Data

US 2002/0070489 A1 Jun. 13, 2002

(30) Foreign Application Priority Data

Dec. 13, 2000 (JP) ........................................ 2000-379161

(51) Int. Cl.[7] ................................................. F16F 5/00
(52) U.S. Cl. ................................................. 267/140.13
(58) Field of Search ........................ 267/140.11, 140.13, 267/140.3, 140.4, 140.5, 141.2, 141.3, 141.4, 141.5

(56) References Cited

U.S. PATENT DOCUMENTS

| | | | | |
|---|---|---|---|---|
| 5,667,205 A | * | 9/1997 | Mutoh et al. | 267/140.13 |
| 5,704,598 A | * | 1/1998 | Kojima | 267/140.13 |
| 5,927,698 A | * | 7/1999 | Miyoshi et al. | 267/140.13 |
| 6,250,616 B1 | * | 6/2001 | Suzuki et al. | 267/140.13 |
| 6,311,963 B1 | * | 11/2001 | Suzuki et al. | 267/140.13 |
| 6,311,964 B1 | * | 11/2001 | Suzuki | 267/140.13 |

FOREIGN PATENT DOCUMENTS

| | | | |
|---|---|---|---|
| GB | 2 166516 A | | 5/1986 |
| JP | 7-54131 | * | 6/1995 |
| JP | 7-56314 | * | 6/1995 |
| JP | 8-14311 | * | 1/1996 |
| JP | 9-257090 | * | 9/1997 |

* cited by examiner

Primary Examiner—Christopher P. Schwartz
(74) Attorney, Agent, or Firm—Rossi & Associates (57) ABSTRACT

A fluid-filled vibration damping device includes a first mounting member and a cup-shaped second mounting member elastically connected by an elastic body such that an opening of the second mounting member fluid-tightly closed by the elastic body. An outer metal sleeve having an outward flange portion at its upper end is bonded by vulcanization to an outer circumferential surface of the elastic body, and a cylindrical orifice member is fitted onto the outer metal sleeve with an upper end face superposed on the outward flange portion. The outer metal sleeve and the orifice member are fitted into the cylindrical wall portion of the second mounting member. An outer metallic ring bonded by vulcanization to an outer periphery of the elastic rubber layer is superposed on an axially upper surface of the outward flange portion portion, and firmly fitted into an open end portion of the cylindrical wall portion of the second mounting member.

15 Claims, 7 Drawing Sheets

FLUID-FILLED VIBRATION DAMPING DEVICE AND METHOD OF PRODUCING THE SAME

INCORPORATED BY REFERENCE

The disclosure of Japanese Patent Application No. 2000-379161 filed on Dec. 13, 2000 including the specification, drawings and abstract is incorporated herein by reference in its entirety.

BACKGROUND OF THE INVENTION

1. Field of the Invention

The present invention relates to a fluid-filled vibration damping device, which is adapted to provide vibration damping effect on the basis of flows of a non-compressible fluid filling a fluid chamber formed therein, and which is suitably used as an engine mount, a body mount and the like for an automotive vehicle.

2. Description of the Related Art

As one type of a vibration coupling or bushing interposed between two members of a vibration system, there is known a fluid-filled vibration damping device. A known example of such a fluid-filled vibration damping device is disclosed in JP-A-9-257090 and JP-A-10-38016, wherein the vibration damping device includes: a first mounting member connectable to one of the two member of the vibration system, and a second mounting member having a generally cup shape and connectable to the other member of the vibration system, said second mounting member being opposed at its open end portion to the first mounting member with an axial spacing therebetween; an elastic body interposed between and elastically connecting the first and second mounting members such that an opening of the second mounting member is fluid-tightly closed by the elastic body, to thereby partially define a pressure receiving chamber on one of opposite sides thereof, which is filled with a non-compressible fluid and located within an interior space of the second mounting member; an elastic rubber layer extending between the first and second mounting member and disposed outward of the elastic body with a spacing therebetween, so as to partially define an equilibrium chamber on the other side of the elastic body remote from the pressure receiving chamber, which is filled with the non-compressible fluid; and an orifice passage for fluid communication between the pressure receiving chamber and the equilibrium chamber.

Upon application of a vibrational load between the first and second mounting members in an axial direction of the vibration damping device in which the first and second mounting member are moved toward and away from each other, a pressure of the fluid in the pressure receiving chamber varies due to an elastic deformation of the elastic body, thus causing a fluid-pressure difference between the pressure receiving chamber and the equilibrium chamber whose volume is variable due to an elastic deformation of the elastic rubber layer. This fluid pressure difference between the pressure receiving chamber and the equilibrium chamber forces the fluid to flow through the orifice passage between the two chambers, so that the fluid-filled vibration damping device exhibits a desired vibration damping effect on the basis of resonance or flows of the fluid flowing through the orifice passage.

In the disclosed fluid-filled vibration damping device, moreover, the pressure receiving chamber is formed in a space interposed between the first and second mounting members, while the equilibrium chamber is disposed radially outwardly of the first mounting member. This arrangement makes it possible to decrease an axial distance between the first and second mounting member, thus effectively minimizing a size of the vibration damping device in its axial direction, while effectively locating an elastic center of the vibration damping device in a relatively lower side of the device. For these advantages, such a known fluid-filled vibration damping device has been employed as an engine mount of the vehicle or the like.

Since the fluid-filled vibration damping device exhibits the desired vibration damping effect on the basis of the resonance or flows of the fluid flowing thought the orifice passage, a vibration damping characteristics of the vibration damping device is effectively tuned by suitably adjusting a length and a cross-sectional area of the orifice passage.

However, the known fluid-filled vibration damping device disclosed in the above-indicated publications suffers from a low degree of freedom in designing the length and cross sectional area of the orifice passage and a resultant difficulty in changing its design. That is, the known fluid-filled vibration damping device suffers from inherent problem, i.e., a low degree of freedom in tuning its vibration damping characteristics.

SUMMARY OF THE INVENTION

It is therefore one object of this invention to provide a novel fluid-filled vibration damping device which is compact in size with a reduced axial distance between a first mounting member and a second mounting member, and which enables to increase a degree of freedom in tuning an orifice passage thereof with a simple structure.

It is another object of this invention to provide a method of producing with ease a fluid-filled vibration damping device which is compact in size with a reduced axial distance between the first mounting member and the second mounting member, and which ensures an increased degree of tuning of the orifice passage thereof.

The above and/or other objects of this invention may be attained according to at least one of the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention disclosed in the whole specification and drawings or that may be recognized by those skilled in the art in the light of the disclosure in the whole specification and drawings.

(1) A fluid-filled vibration damping device comprising: (a) a first mounting member; (b) a second mounting member having a generally cup shape and being opposed at an open end portion to the first mounting member with a given spacing therebetween; (c) an elastic body interposed between and elastically connecting the first and second mounting members such that the open end portion of the second mounting member is fluid-tightly closed by the elastic body; (d) a pressure receiving chamber partially defined by the elastic body and formed within the second mounting member on one of opposite side of the elastic body, the pressure receiving chamber being filled with a non-compressible fluid; (e) an elastic rubber layer extending between the first and second mounting members and disposed outward of the elastic body with a spacing therebetween; (f) an equilibrium chamber partially defined by the elastic rubber layer and formed on an other one of the opposite sides of the elastic body, the equilibrium chamber being filled with the non-compressible fluid; (g) an outer circumferential metallic sleeve having a generally cylindrical shape and bonded to an outer circumferential surface of the elastic body upon vulcanizing a rubber material for forming the elastic body, the outer circumferential metallic sleeve including an outward flange portion integrally formed at one of axially opposite ends thereof located on a side of the open end portion of the second mounting member, so as to extend radially outwardly; (h) a cylindrical orifice member disposed radially outwardly on the outer circumferential metallic sleeve with one of axially opposite end faces thereof superposed on one of axially opposite surfaces of the outward flange portion of the outer circumferential metallic sleeve which is remote from the open end portion of the second mounting member, the orifice member together with the outer circumferential metallic sleeve being fitted into a cylindrical wall portion of the second mounting member so that the orifice member is interposed between the outer circumferential metallic sleeve and the cylindrical wall portion of the second mounting member to define therebetween an orifice passage for fluid communication between the pressure receiving chamber and the equilibrium chamber; (i) an outer metallic ring bonded to an outer peripheral portion of the elastic rubber layer upon vulcanization of a rubber material for forming the elastic rubber layer, the outer metallic ring being superposed on an other one of the axially opposite surfaces of the outward flange portion of the outer circumferential metallic sleeve, while being fixedly fitted into the cylindrical wall portion of the second mounting member.

In the fluid-filled vibration damping device constructed according to this mode of the invention, the orifice member is interposed between the outer circumferential metallic sleeve and the cylindrical wall portion of the second mounting member. Since a configuration of the orifice passage can be defined by the orifice member, a length and a cross-sectional area of the orifice passage can be designed with a high degree of freedom, and can be changed with ease. For instance, a vibration damping characteristics of the fluid-filled vibration damping device can be change by simply changing the orifice member.

Further, the orifice member is disposed radially outwardly of the elastic body, so that the orifice member can be assembled in the vibration damping device without increasing a size of the vibration damping device in its axial direction. Thus, the fluid-filled vibration damping device is surely made compact in size in its height dimension.

In the fluid-filled vibration damping device of this mode of the invention, the orifice member, the outer circumferential metallic sleeve and the outer metallic ring are superposed one another in the axial direction thereof. In this arrangement, the outer metallic ring is fixed to the second mounting member with high strength, thus ensuring a firm fixing of the orifice member and the outer circumferential metallic sleeve as well as the outer metallic ring with respect to the second mounting member, with high strength. Thus, the fluid-filled vibration damping device of this mode of the invention enables with ease to assemble the outer metallic ring, the orifice member and the outer circumferential metallic sleeve with respect to the second mounting member, with high stability and with a simple structure.

(2) A fluid-filled vibration damping device according to the above-indicated mode (1) of the invention, wherein the orifice member is superposed at an other one of the axially opposite end faces thereof on a side of a bottom wall portion of the second mounting member, and includes an annular protrusion integrally formed at the other one of the axially opposite end faces thereof so as to protrude radially inwardly, wherein the elastic body is held in abutting contact at an end face of an outer peripheral portion thereof on the annular protrusion, and wherein the annular protrusion is formed with a first communication passage through which one of opposite ends of the orifice passage is held in fluid communication with the pressure receiving chamber.

In this mode of the invention, the first communication passage serving as an opening of the orifice passage to the pressure receiving chamber is formed in the orifice member. In comparison with the case where the first communication passage is formed in the elastic body or the outer circumferential metallic sleeve, the vibration damping device of this mode is able to eliminate a need for positioning the orifice passage with respect to the first communication passage, thus ensuring an improved efficiency of assembling of the orifice member.

Further, an axial dimension or thickness of the annular protrusion of the orifice member may be changed to adjust the axial dimension of the outer peripheral portion of the elastic body. This makes it possible to adjust a spring characteristics of the elastic body and the vibration damping device.

(3) A fluid-filled vibration damping device according to the above indicated mode (2) of the invention, wherein the first communication passage has a tunnel form extending through the annular protrusion or a groove form open to the bottom surface of the second mounting member, and the outer circumferential metallic sleeve is fluid-tightly superposed on the annular protrusion over an entire circumference thereof in an axial direction thereof with the elastic body interposed therebetween.

In this mode of the invention, the outer peripheral portion of the elastic body is fluid tightly held in abutting contact with the annular protrusion over its entire circumference. This arrangement is effective to prevent a leakage of the fluid through a clearance formed between the outer circumferential metallic sleeve and the orifice member and a resultant shortening of the orifice passage. Therefore, the fluid-filled vibration damping device of this mode of the invention is capable of exhibiting a desired damping effect with high stability.

A fluid-filled vibration damping device according to any one of the above-indicated modes (1)–(3), wherein the orifice member includes a first communication passage for fluid communication of one of opposite ends of the orifice passage with the pressure receiving chamber, and a second communication passage for fluid communication of an other one of the opposite ends of the orifice passage with the equilibrium chamber.

In this mode of the invention, both of the first and second communication passages serving as openings of the orifice passage with respect to the pressure receiving chamber and the equilibrium chamber are formed in the orifice member. In comparison with the case where the first and second communication passages are formed in the elastic body and/or the outer circumferential metallic sleeve, the vibration damping device of this mode eliminates a need for positioning of the orifice member with respect to the elastic body and the outer circumferential metallic sleeve in a circumferential direction thereof. This arrangement permits a further improved efficiency of assembling of the orifice member.

(5) A fluid-filled vibration damping device according to the above-indicated mode (4) of the invention, wherein the outward flange portion of the outer circumferential metallic sleeve has a plurality of windows formed therethrough and spaced apart from each other in a circumferential direction thereof, such that the second communication passage is held in fluid communication with the equilibrium chamber through any one of the window irrespective of a circumferential position of the orifice member relative to the outer circumferential metallic sleeve.

The arrangement of this mode of the invention makes it possible to form the second communication passage, i.e., the opening of the orifice passage to the equilibrium chamber, substantially only in the orifice member, even in the case where the orifice passage is connected to the equilibrium chamber on the side of the one of axially opposite end faces of the orifice member in which the outward flange portion of the circumferential metallic sleeves is placed on the orifice member. This arrangement eliminates a need for positioning the orifice member to the outer circumferential metallic sleeve in the circumferential direction thereof.

(6) A fluid-filled vibration damping device according to any one of the above-indicated modes (1)–(5), wherein a bottom wall portion of the second mounting member includes a through hole, and a movable rubber plate is elastically deformably disposed in the through hole such that the through hole is fluid tightly closed by the movable rubber plate.

In this mode of the invention, an elastic deformation of the movable rubber plate functions to reduce or absorb a fluid pressure change of the pressure receiving chamber upon application of a vibrational load within a high frequency band in which a resistance to flow of the fluid through the orifice passage tends to be increased. Therefore, the presence of the movable rubber plate ensures an improved vibration damping effect of the vibration damping device with respect to vibrations having a relatively high frequency and a relatively small amplitude.

(7) A fluid-filled vibration damping device according to the above mode (6), wherein the one of axially opposite end of the orifice member on a side of the bottom wall portion of the second mounting member extends radially inwardly so as to form a stop portion having at least one through hole, the stop portion being located axially inward of the movable rubber plate with a given axial spacing therebetween, so as to limit an amount of displacement of the movable rubber plate in a direction toward an inside of the pressure receiving chamber.

In this mode of the invention, a stopper mechanism for limiting an excessively large amount of displacement of the movable rubber plate toward the inside of the pressure receiving chamber can be provided by utilizing the orifice member, without needing additional member.

(8) A fluid-filled vibration damping device according to the above-indicated mode (6) or (7), further comprising: a covering member superposed on the bottom wall portion of the second mounting member and fixed onto the cylindrical wall portion of the second mounting member, so as to form a protecting part having an air hole and located axially outward of the movable rubber plate with an axial spacing therebetween, the protecting part being adapted to limit an amount of displacement of the movable rubber plate in a direction away from the pressure receiving chamber.

In this mode of the invention, the use of the covering member makes it possible to provide with a simple structure a stopper for limiting an excessively large amount of displacement of the movable rubber plate in the direction away from the pressure receiving chamber, and a cover member for protecting the movable rubber plate from an interference with other components or members.

(9) A fluid-filled vibration damping device according to any one of the above-indicated modes (1)–(8) wherein the orifice member includes a circumferential groove open in an outer circumferential surface thereof, and an opening of the circumferential groove is closed by the cylindrical wall portion of the second mounting member, to thereby form the orifice passage.

In this mode of the invention, a length and a cross sectional area of the orifice passage can be easily changed by adjusting the shape or other factors of the grooves. The use of the orifice member arranged as described above makes it easy to form the orifice passage extending along the cylindrical wall portion of the second mounting member with a circumferential length which is larger than an entire circumference of the cylindrical wall portion of the second mounting member. This arrangement ensures a high degree of freedom in tuning a vibration damping characteristics of the fluid-filled vibration damping device. In order to prevent the above-indicated shortening of the orifice passage with high stability, a sealing rubber layer may be bonded to an inner circumferential surface of the cylindrical wall portion of the second mounting member and compressed between the orifice member and the second mounting member, preferably. Yet preferably, the orifice member is press-fitted into the second mounting member, or alternatively is disposed radially inward of the cylindrical wall portion of the second mounting member, and then the cylindrical wall portion is radially inwardly drawn onto the outer circumferential surface of the orifice member, so that the orifice member is held in close contact with the cylindrical wall portion of the second mounting member. Further, the outer circumferential metallic sleeve is bonded by vulcanization to the elastic body and is preferably press-fitted into and radially outwardly forced onto second mounting member so that the outer circumferential metallic sleeve is firmly fixed to the second mounting member.

(10) A fluid-filled vibration damping device according to any one of the above modes (1)–(8), further comprising an inner metallic ring bonded to an inner peripheral portion of the elastic rubber layer upon vulcanizing a rubber material for forming the elastic rubber layer, wherein the metallic fixing member is fixedly fitted onto the first mounting member.

In this mode of the invention, the elastic body and the elastic rubber layer are formed independently of each other. This makes it possible to simplify a structure of a mold for forming the elastic body and the elastic rubber layer, and to facilitate a manufacture of the elastic body and the elastic rubber layer, while permitting to form the elastic body and the elastic rubber layer with different materials, resulting in an increased degree of freedom in designing the fluid-filled vibration damping device of this mode. Moreover, the use of the metallic fixing member enables to firmly fix the inner peripheral portion of the elastic rubber layer to the first mounting member, with a simple assembling operation.

(11) A method of producing a fluid-filled vibration damping device defined in any one of the above modes (1)–(10), comprising the steps of: (i) press-fitting the outer circumferential metallic sleeve bonded to an outer circumferential surface of the elastic body to which the first mounting member is bonded and the orifice member into the cylindrical wall portion of the second mounting member; (ii)

press-fitting the outer metallic ring bonded to the elastic rubber layer into the cylindrical wall portion of said second mounting member such that the outer metallic ring is superposed on the orifice member and the outward flange portion of the outer circumferential metallic sleeve in an axial direction thereof; and then (iii) radially inwardly drawing an open end portion of the cylindrical wall portion of the second mounting member so that the outer metallic ring is disassembly firmly fitted into the cylindrical wall portion of said second mounting member.

This method of the invention enables to form the fluid-filled vibration damping device according to the invention with ease, and facilitate assembling of the elastic body bonded to the first mounting member with the second mounting member, which are formed independently of each other. For instance, the assembling of the integral vulcanized assembly of the elastic body, the orifice member, and the elastic rubber layer with respect to the second mounting member may be effected within a mass of a non-compressible fluid, thus facilitating filling the pressure receiving chamber and the equilibrium chamber with the non-compressible fluid.

BRIEF DESCRIPTION OF THE DRAWINGS

The above and optical objects, features and technical or industrial significance of the present invention will be better understood by reading the following detailed description of a presently preferred embodiment of the invention, when considered in connection with the ccompanying drawings, in which.

DETAILED DESCRIPTION OF PREFERRED EMBODIMENTS

Figure 1:
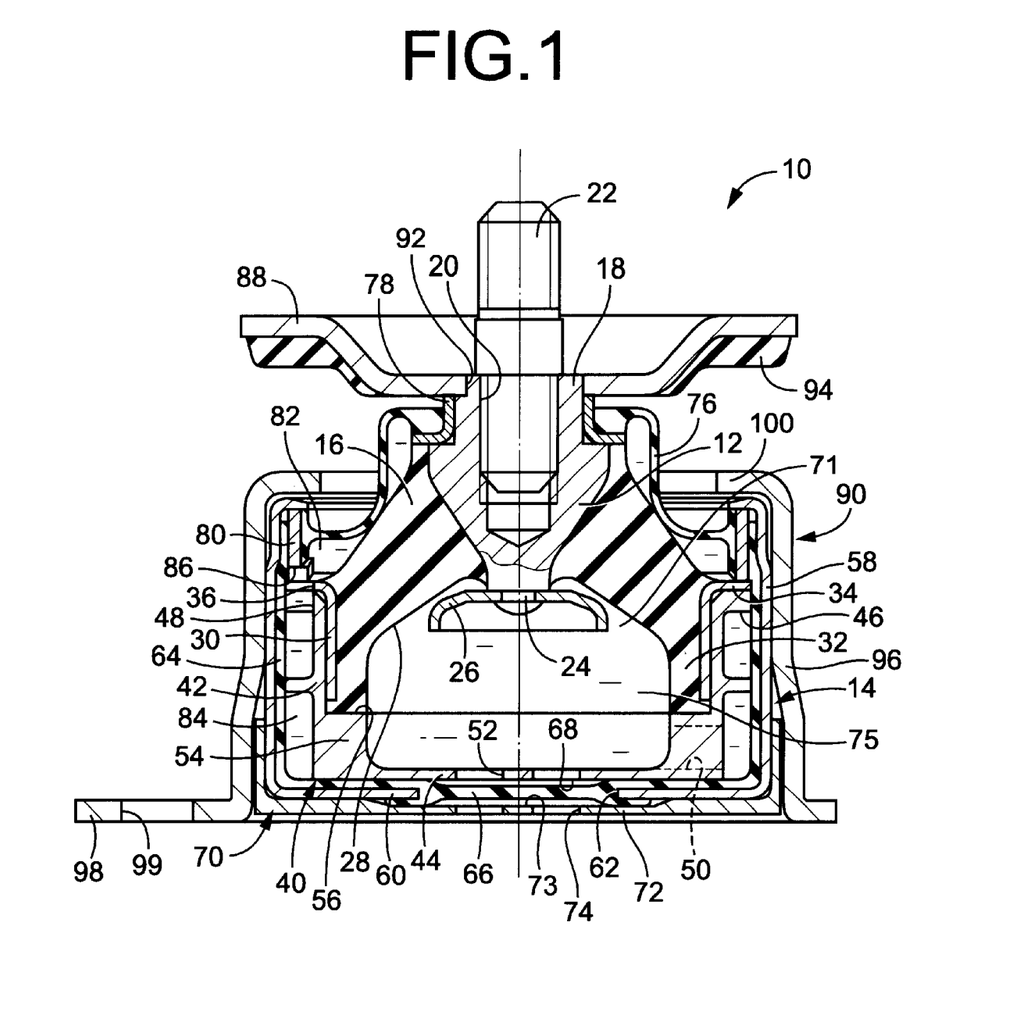
FIG. 1 is an elevational view in vertical or axial cross section of an engine mount for an automotive vehicle, which is constructed according to first embodiment of the invention, which corresponds to a cross sectional view taken along line 1—1 of FIG. 2.
Figure 2:
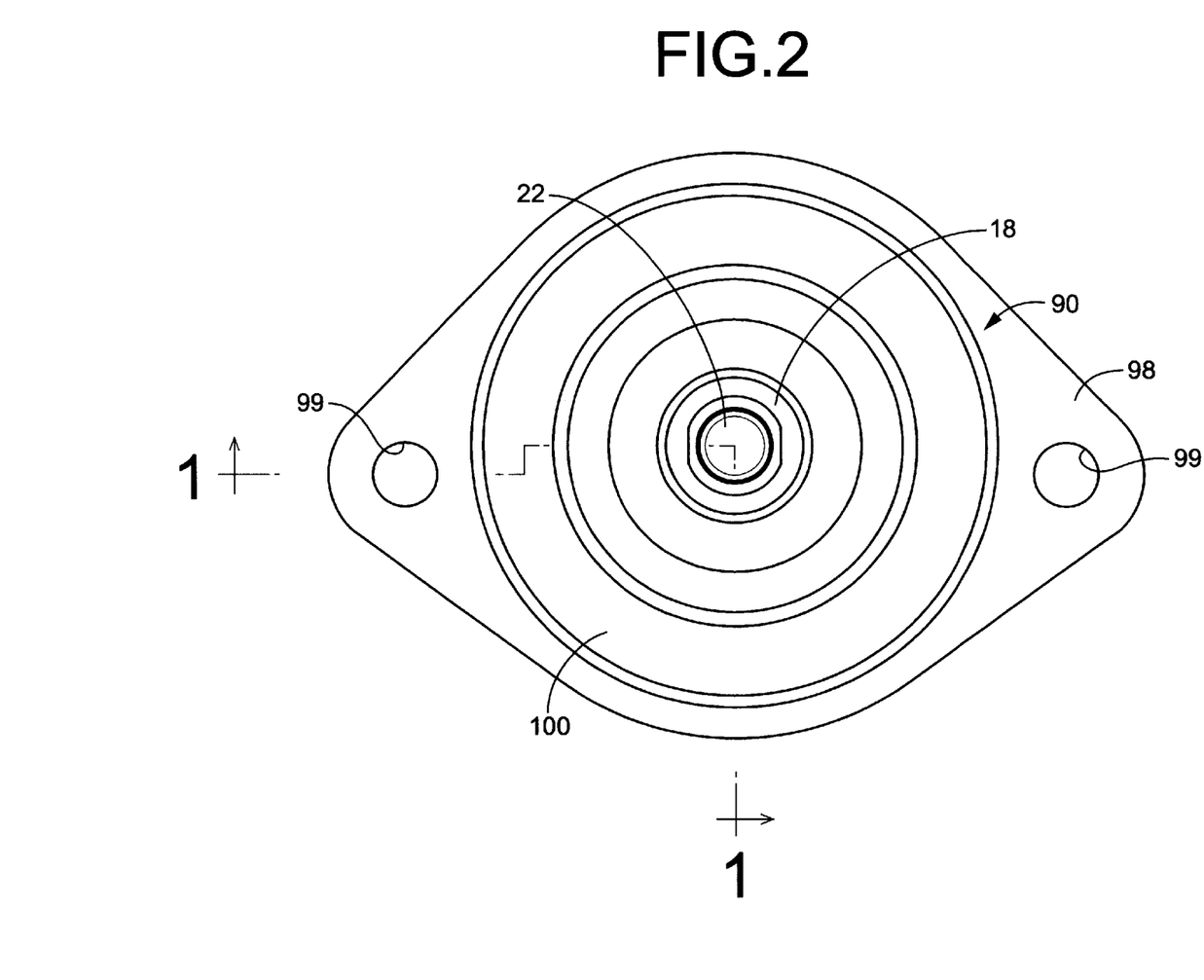
FIG. 2 is a top plane view of the engine mount of FIG. 1 in which a stop member shown in FIG. 1 is not assembled to the engine mount.

Referring first to FIGS. 1 and 2, there is shown an engine mount 10 for an automotive vehicle, which is constructed according to one preferred embodiment of the invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material, and are attached to the power unit and the body of the vehicle, so that the power unit which includes an engine is mounted on the vehicle body in a vibration damping fashion. With the engine mount 10 installed on the vehicle as described above, the engine mount 10 functions to damp input vibrations which are applied in the direction in which the two mounting members 12, 14 are opposed to each other, namely, in the vertical direction as seen in FIG. 1 and in a direction almost parallel to the vertical direction. In the following description, the terms "upper" and "lower" are basically used on the basis of the vertical or lavational direction of FIG. 1.

The first mounting member 12 has a generally inverted truncated conical shape, and includes a fixing projection 18 integrally formed at its large-diameter end face so as to extend axially upwardly as seen in FIG. 1. The fixing projection 18 includes a cylindrical outer circumferential surface which is provided at its protruding end face with a width across flat. The first mounting member 12 has a tapped hole 20 formed so as to axially extend and open in an axially upper end face of the fixing projection 18. A stud 22 is screwed into the tapped hole 20 so as to protrude axially upwardly from the fixing projection 18. The first mounting member 12 further includes a support rod 24 integrally formed at its small-diameter end face so as to protrude axially downwardly. The support rod 24 is adapted to support a restricting member in the form of a hat-shaped metal member 26 which is fixed to the support rod 24 by calking or crimping so as to extend in a direction perpendicular to axial direction of the first mounting member 12.

Figure 3:
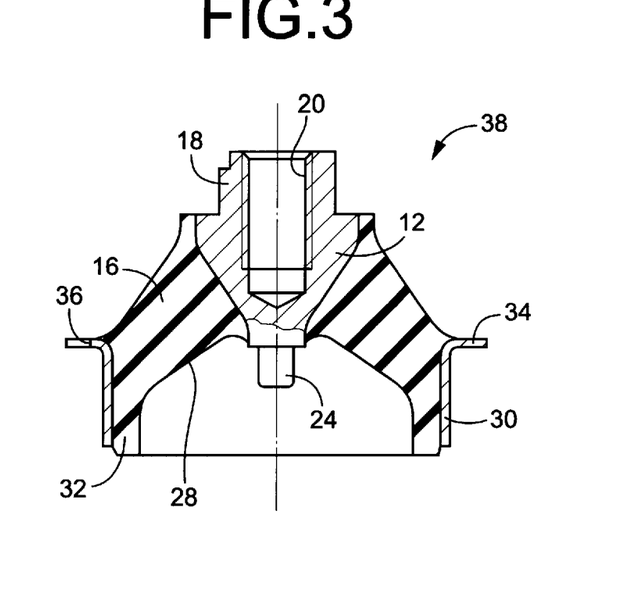
FIG. 3 is an elevational view in vertical or axial cross section of an integral vulcanizes assembly of the engine mount of FIG. 1, which corresponds to a cross sectional view taken along line 3—3 of FIG. 4.
Figure 4:
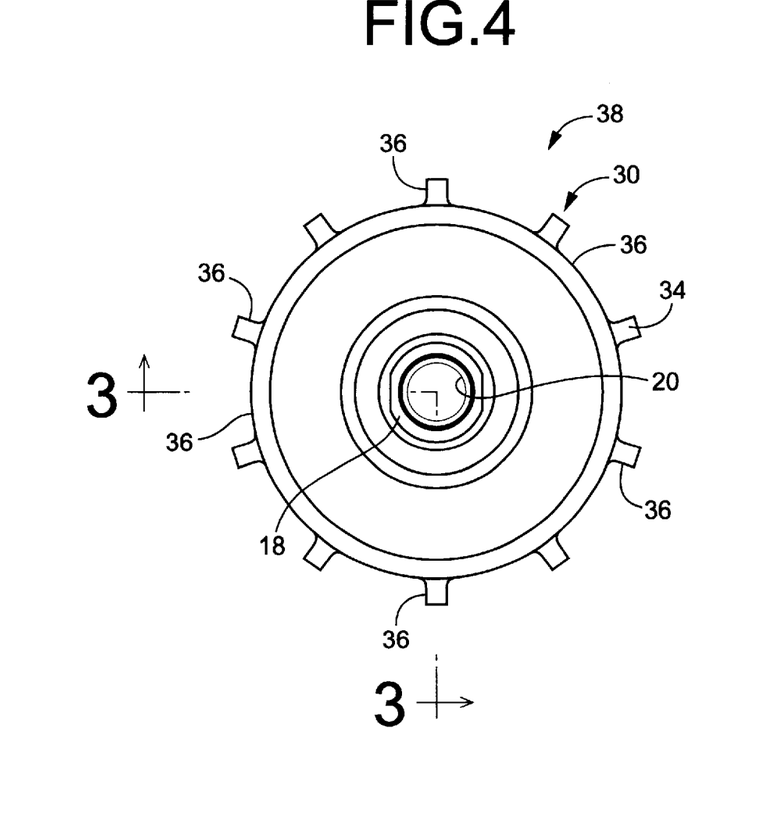
FIG. 4 is a top plane view of the integral vulcanized assembly of FIG. 3.
Figure 5:
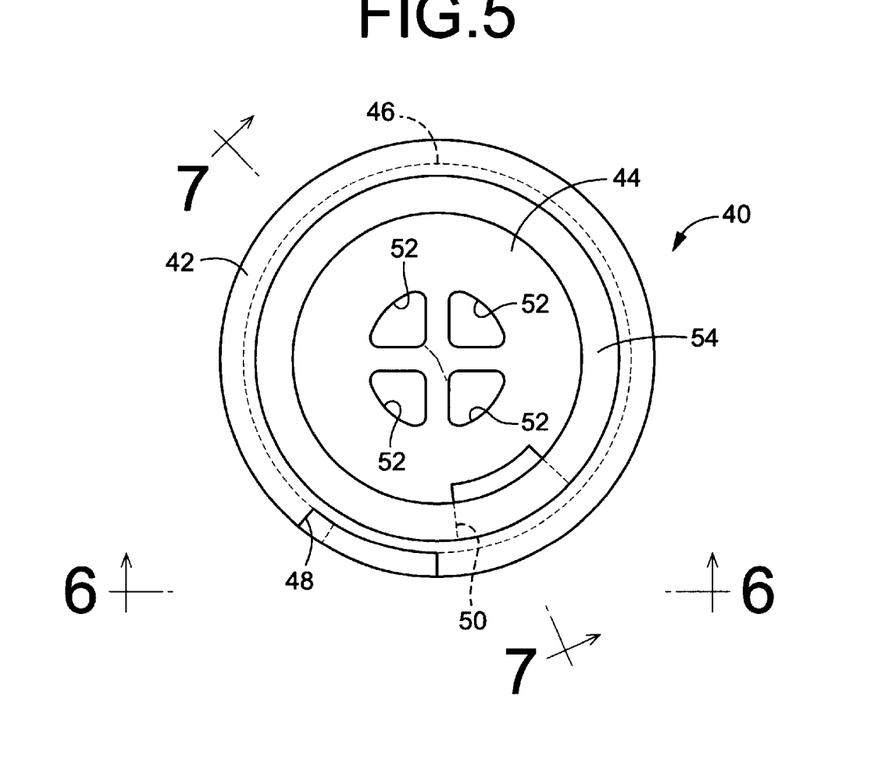
FIG. 5 is a top plane view of an orifice member of the engine mount of FIG. 1.
Figure 6:
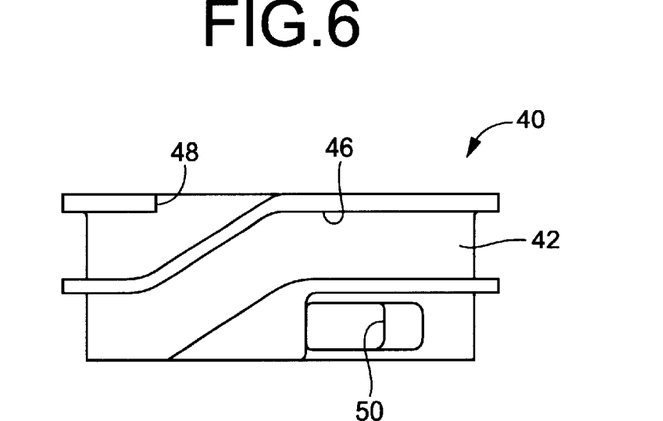
FIG. 6 is a cross sectional view taken along line 6—6 of FIG. 5.

The elastic body 16 is bonded to the first mounting member 12 in the process of vulcanization of a rubber material to form the elastic body 16. As shown in FIGS. 3 and 4, the elastic body 16 has a generally frusto-conical shape, and is bonded at its small diameter portion to the first mounting member 12, such that the first mounting member 12 and the elastic body 16 are held in a substantially concentric or coaxial relationship with each other, and the elastic body 16 is bonded by the above-indicated vulcanization process to an outer circumferential surface of the first mounting member 12. The elastic body 16 has a recess 28 open in its large diameter end face thereof, so that the support rod 24 protrudes axially downwardly from a central portion of a bottom surface of the recess 28. Thus, the hat-shaped member 26 supported by the support rod 24 is located within the recess 28.

The elastic body 16 is also bonded at an outer circumferential surface of its large diameter end portion to an inner circumferential surface of a cylindrical outer metal sleeve 30 as an outer circumferential metallic sleeve. The elastic body 16 includes an integrally formed cylindrical outer peripheral portion 32. The outer peripheral portion 32 extends axially downwardly along the inner circumferential surface of the outer metal sleeve 30 with a relatively large wall thickness, so as to protrude axially downward of the outer metal sleeve 30 by a predetermined axial length as seen in FIG. 1. The outer metal sleeve 30 has an annular outward flange portion 34 integrally formed at its axially upper end portion extending in a radially outward direction with a predetermined width. The outward flange portion 34 has a plurality of windows in the form of cutouts 36 (e.g., 10 cutouts in the present embodiment) which are spaced apart from each other in a circumferential direction of the outward flange portion 34 at regular intervals. Each of the cutouts 36 is open in an outer periphery of and extends in the circumferential direction of the outward flange portion 34, with a radial width which is larger than a half of a radial width of the outward flange portion 34.

That is, the elastic body 16 is bonded at its small diameter portion to the first mounting member 12 extending through the central portion of the elastic body 16 extending along an center axis of the elastic body 16, and at its large diameter portion to the outer metal sleeve in the above-indicated vulcanization process, to thereby form an integral vulcanized assembly 38 consisting of the first mounting member 12, the elastic body 16 and the outer metal sleeve 30.

This integral vulcanized assembly 38 is assembled with an orifice member 40 as shown in FIGS. 5–8. The orifice member 40 is made of a rigid material, e.g., a metallic material such as an aluminum alloy and a synthetic resin material. As is apparent from FIGS. 5–8, the orifice member 40 consists of a thick-walled cylindrical wall portion 42 and a thin-disk shaped bottom wall portion 44 adapted to close an axially lower opening of the orifice member 40. Thus, the orifice member 40 has a generally cylindrical cup shape in its entirety.

The cylindrical wall portion 42 of the orifice member 40 is formed with a circumferential groove 46 open in its outer circumferential surface. The circumferential groove 46 extends in a circumferential direction of the cylindrical wall portion 42 with a substantially constant cross sectional shape and with a circumferential length which is somewhat smaller than twice the circumference of the cylindrical wall portion 42. The circumferential groove 46 is open at one of opposite ends thereof in an axially upper end face of the orifice member 40 through a second communication passage in the form of an opening 48 and at the other end thereof in an inner circumferential surface of the orifice member 40 through a first communication passage in the form of a communication passage 50 formed through an axially lower end portion of the cylindrical wall portion 42 of the orifice member 40. On the other hand, the bottom wall portion 44 of the orifice member 40 has a plurality of fluid communication holes 52 formed through a central portion thereof.

Figure 7:
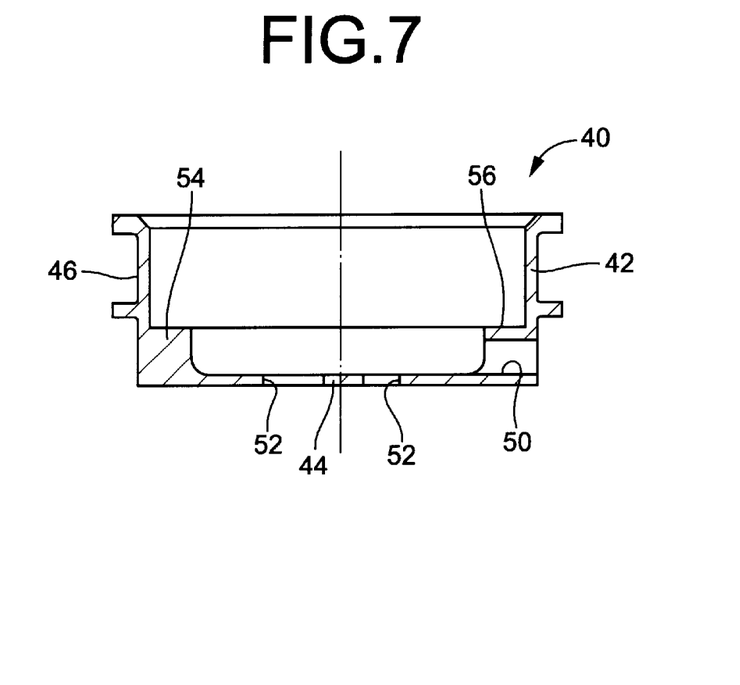
FIG. 7 is a cross sectional view taken along line 7—7 of FIG. 5.
Figure 8:
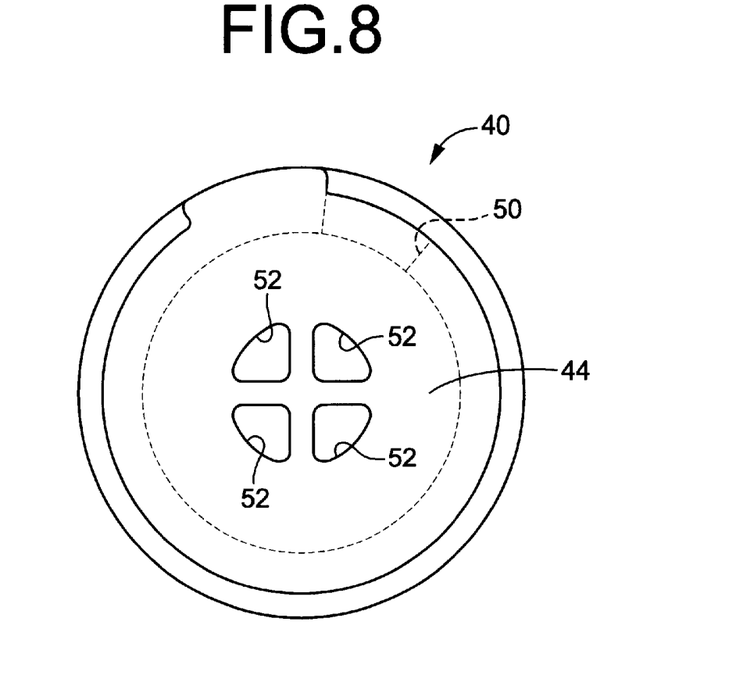
FIG. 8 is a bottom plane view of an orifice member of FIG. 5.

The wall thickness of the cylindrical wall portion 42 of the orifice member 40 is increased at its axially lower end portion, to provide an annular protrusion 54 integrally formed at a connecting portion between the cylindrical wall portion 42 and the bottom wall portion 44, so as to protrude radially inwardly. The annular protrusion 54 extends over an entire circumference of the orifice member 40 with a substantially constant rectangular cross-sectional shape. An axially upper end face of the annular protrusion 54 serves as a sealing abutting surface 56. As shown in FIG. 7, the communication passage 50 is formed through a part of the annular protrusion 54 so that the circumferential groove 46 is open at the other end thereof in the inner circumferential surface of the cylindrical wall portion 42 of the orifice member 40.

Referring back to FIG. 1, the orifice member 40 formed as described above, is assembled with the integral vulcanized assembly 38 such that the orifice member 40 is disposed radially outwardly on the outer circumferential surface of the outer metal sleeve 30 with the outward flange portion 34 of the orifice member being held in abutting contact with an axially upper end face of the cylindrical wall portion 42 of the orifice member 40, and with an axially lower end face of the outer peripheral portion 32 of the elastic body 16 being held in close contact with the sealing abutting surface 56 of the annular protrusion 54. In order to assure fluid tight-sealing between the orifice member 40 and the outer metal sleeve 30, and in order to prevent disengagement or occurrence of clearance between the orifice member and the outer metal sleeve 30, it is preferable that the orifice member 40 is forcedly press fitted onto the outer metal sleeve 30 with a somewhat pressure force.

Figure 9:
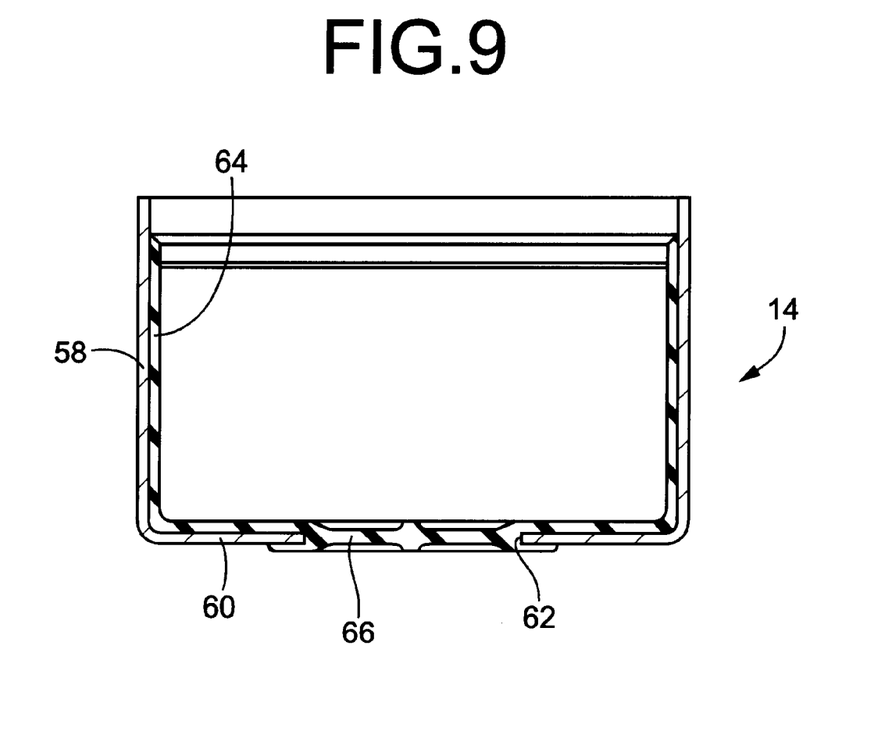
FIG. 9 is an elevational view in vertical or axial cross section of a second mounting member of the engine mount of FIG. 1.

Referring next to FIG. 9, the second mounting member 14 consists of a cylindrical wall portion 58 and a disk-shaped bottom wall portion 60. Thus, the second mounting member 14 has a generally thin-walled cup shape in its entirety. The second mounting member 14 has an inner and an outer diameter which are slightly larger than those of the outer metal sleeve 30 and the orifice member 40. The bottom wall portion 60 of the second mounting member 14 has a through hole 62 formed through a central portion thereof. A sealing rubber layer 64 is bonded to a substantially entire area of an inner circumferential surface of the cylindrical wall portion 58 and an upper surface of the bottom wall portion 60, except an axially upper end portion of the cylindrical wall portion 58. A movable rubber plate 66 having a disk-shape is disposed within the through hole 62 so as to extend in a direction perpendicular to an axial direction of the second mounting member 14 with a substantially constant thickness. The movable rubber plate 66 is bonded at its peripheral portion to an outer peripheral portion of the through hole 62 in the process of vulcanization of a rubber material to form the movable rubber plate 66, thus fluid-tightly closing the opening of the through hole 62. In this condition, the movable rubber plate 66 extend over the entire area of the through hole 62 without slack and exhibits sufficient elasticity thereof so that the movable rubber plate 66 is held in its original or neutral position in which the movable rubber plate 66 has substantially no internal strain, and so that the movable rubber plate 66 is elastically deformable on the basis of a pressure difference between pressures applied to opposite side of the movable rubber plate 66.

As shown in FIG. 1, the second mounting member 14 is assembled with the integral vulcanized assembly 38 and the orifice member 40. Described in detail, the orifice member 40 is held in close contact at the bottom wall portion 44 thereof with the bottom wall portion 60 of the second mounting member 14 with the sealing rubber layer 64 interposed therebetween, and at the cylindrical wall portion 42 thereof with the cylindrical wall portion 58 of the second mounting member 14 with the sealing rubber layer 64 interposed therebetween. In this condition, openings of the fluid communication holes 52 as at least one of through hole formed through the bottom wall portion 44 of the orifice member 40 is fluid-tightly closed by the bottom wall portion 60 of the second mounting member 14 placed on an axially outer or lower side of the bottom wall portion 44 of the orifice member 40. Since the central portion of the bottom wall portion 60 of the second mounting member 14 is constituted by the movable rubber plate 66, the central portion of the bottom wall portion 44 of the orifice member 40 is opposed to the movable rubber plate 66 with a slight spacing 68 interposed therebetween, so that the movable rubber plate 66 is elastically deformable. A covering member in the form of the metallic cover member 70 having a shallow cylindrical cup shape is press fitted onto the bottom portion of the second mounting member 14 such that a bottom wall portion 72 of the metallic cover member 70 is opposed to the movable rubber plate 66 with a slight spacing 73 interposed therebetween, thus permitting the elastic deformation of the movable rubber plate 66. The bottom wall portion 72 has air holes 74 formed through a central portion thereof. The presence of the air holes 74 permits a free elastic deformation of the movable rubber plate 66, while prohibiting an excessive deformation of the movable rubber plate 66 toward an external area or in a direction away from a pressure receiving chamber 75 which will be described. That is, the central portion of the bottom wall portion 72 serves as a protecting part.

With the orifice member 40 and the integral vulcanized assembly 38 are assembled within the second mounting member 14 as described above, the pressure receiving chamber 75 partially defined by the elastic body 16 is formed between the first and second mounting member 12, 14. The pressure receiving chamber 75 is filled with a suitable non-compressible fluid, such as water, alkylene glycol, polyalkylene glycol, or silicone oil. For the present engine mount 10 to exhibit an excellent damping effect based on resonance of the fluid, which will be described later, it is desirable to select a non-compressible fluid having a viscosity of not higher than 0.1 Pa·s.

This pressure receiving chamber 75 is also patially defined by the movable rubber plate 66. Upon application of a vibrational load between the first and second mounting members 12, 14, a fluid pressure change induced in the pressure receiving chamber 75 is absorbed r minimized by the elastic deformation of the movable rubber plate 66. This permits the engine mount 10 to exhibit an excellent vibration isolating effect with respect to an intermediate or high frequency vibrations such as engine idling vibrations and low-speed booming noises.

Within the pressure receiving chamber 75, the periphery of the hat-shaped member 26 is opposite to and cooperates with the corresponding portion of an inner surface of the recess 28 to define therebetween a substantially annular restricting fluid passage 71. Upon application of a vibrational load between the first and second mounting members 12, 14, the hat-shaped member 26 is displaced within the pressure receiving chamber 75 in the load receiving direction, together with the first mounting member 12, so that the fluid in the pressure receiving chamber 75 is forced to flow through the restricting fluid passage 71. Therefore, the engine mount 10 of the present embodiment is able to exhibit a predetermined vibration damping effect on the basis of the resonance of the fluid flowing through the restricting fluid passage 71. The restricting fluid passage 71 may be tuned so as to exhibit a desired vibration damping or isolating effect based on resonance of the fluid flowing through the restricting fluid passage 71, with respect to vibrations whose frequency band is different from a frequency band to which the movable rubber plate 66 is tuned to exhibit a vibration damping effect on the basis of the elastic deformation thereof. Described in detail, the restricting fluid passage 71 is tuned so that the engine mount 10 exhibits a low dynamic spring constant and an accordingly high vibration isolating effect on the basis of resonance of the fluid flowing through the restricting fluid passage 71, with respect to medium or high frequency vibrations such as intermediate and high-speed booming noises.

Figure 10:
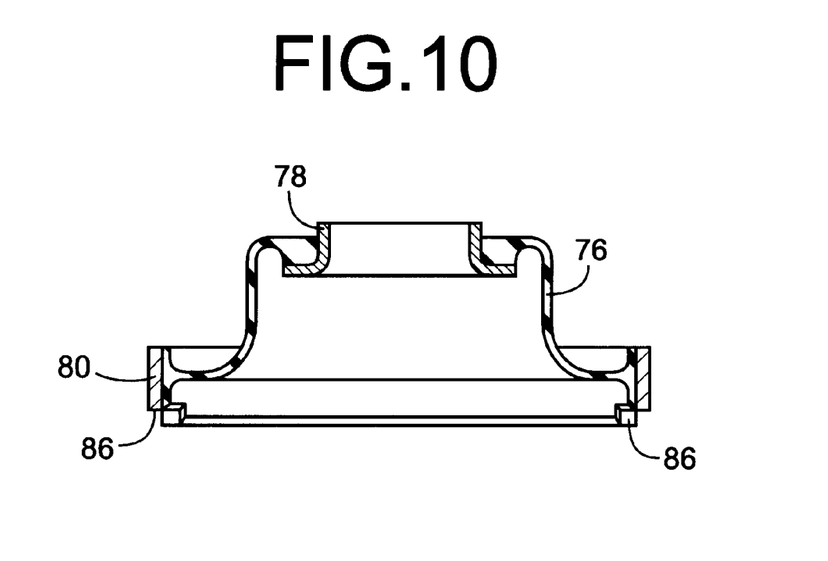
FIG. 10 is an elevational view in vertical or axial cross section of a elastic rubber layer of the engine mount of FIG. 1.

To the thus constructed second mounting member 14, an elastic rubber layer 76 is assembled such that the elastic rubber layer 76 is disposed radially outwardly of the orifice member 14 and the elastic body 16. As shown in FIG. 10, the elastic rubber layer 76 is formed of a thin flexible rubber easily deformable and has a generally annular plate-like shape in its entirely. The elastic rubber layer 76 is bonded at its inner peripheral portion to an inner metallic ring in the form of an inner fixing member 78 and at its outer peripheral portion to an outer metallic ring in the form of an outer fixing member 80. The inner and outer fixing members 78, 80 are both made metal and have a generally annular or a generally cylindrical shape. The inner fixing member 78 is press fitted onto an outer circumferential surface of the fixing projection 18, so that the inner peripheral portion of the elastic rubber layer 76 is fluid tightly fixed to the first mounting member 12. On the other hand, the outer fixing member 80 is fitted into the inner circumferential surface of the cylindrical wall portion 58 of the second mounting member 14. The cylindrical wall portion 58 of the second mounting member 14 is pressed onto an outer circumferential surface of the outer fixing member 80 by drawing or caulking, so that the outer peripheral portion of the elastic rubber layer 76 is fluid-tightly fixed to the second mounting member 14. In the present embodiment, an open end portion of the cylindrical wall portion 58 of the second mounting member 14 is bent radially inwardly and is placed on an axially upper end face of the outer fixing member 80, to thereby prevent an disengagement or removal of the outer fixing member 80 from the second mounting member 14 with high stability.

The outer fixing member 80 is superposed on an axially upper end face of the outward flange portion 34 superposed on the upper end face of the orifice member 40. With the outer fixing member 80 being fitted into the second mounting member 14 as described above, the outer metal sleeve 30 and the orifice member 40 are both pressed onto the bottom surface 60 of the second mounting member 14, and fixedly located with respect to the second mounting member 14 in the axial direction of the second mounting member 14.

With the elastic rubber layer 76 assembled with respect to the first and second mounting member 14, the elastic rubber layer 76 cooperates with the elastic body 16 to define therebetween an equilibrium chamber 82 disposed radially outwardly of the elastic body 16 and being filled with the non-compressible fluid. That is, the equilibrium chamber 82 is formed on an axially upper side of the elastic body 16 while the pressure receiving chamber is formed on an axially lower side of the elastic body 16. The elastic rubber layer 76 extends between the first and second mounting members 12, 14 with a slack, so that a volume of the equilibrium chamber 82 is easily variable so as to absorb a pressure change of the fluid filled in the equilibrium chamber 82. A sealing rubber layer 64 is compressed by and between the inner fixing member 78 and the first mounting member 12, while the sealing rubber layer 64 is compressed by and between the outer fixing member 80 and the second mounting member 14, thus assuring a fluid-tight sealing of the equilibrium chamber 82.

This equilibrium chamber 82 is held in fluid communication with the pressure receiving chamber 75 through an orifice passage 84 partially defined by the orifice member 40. In this respect, the orifice member 40 has an outer diameter which is smaller than the inner diameter of the cylindrical wall portion 58 of the second mounting member 14, but is larger than the inner diameter of the sealing rubber layer 64 bonded to the inner circumferential surface of the cylindrical wall portion 58 of the second mounting member 14. Therefore, the orifice member 40 is fixedly fitted into the second mounting member 14 such that the inner circumferential surface of the cylindrical wall portion 58 of the second mounting member 14 is fluid-tightly pressed on the outer circumferential surface of the orifice member 40 with the sealing rubber layer 64 compressed therebetween. Further, the bottom wall portion 44 of the orifice member 40 is fluid-tightly held in abutting contact with the bottom wall portion 60 of the second mounting member 14.

With the orifice member 40 fluid-tightly fixed within the second mounting member 14 as described above, the opening of the circumferential groove 46 is fluid-tightly closed by the cylindrical wall portion of the second mounting member 14 via the sealing rubber layer 64, thus providing the orifice passage 84. This orifice passage 84 is held in fluid communication at one of opposite ends thereof with the pressure receiving chamber 75 through the communication passage 50, and at the other end thereof with the equilibrium chamber 82 through the opening 48 formed through the orifice member 40. While the outward flange portion 34 of the outer metal sleeve 30 is superposed on the upper end face of the orifice member 40 in which the opening 48 is open, the outward flange portion 34 does not close the opening 48, since the outward flange portion 34 is formed with the plurality of cutouts 36 equally spaced apart from each other its circumferential direction. Therefore, the opening 48 formed in the orifice member 40 is held in fluid communication with the equilibrium chamber 82, irrespective of a circumferential position of the orifice member 40 relative to the outer metal sleeve 30. In the present embodiment, moreover, the outer fixing member 80, which is bonded to the elastic rubber layer 76, and which is superposed at its axially lower end face on the outward flange portion 34, has a pair of cutouts 86 open in the axially lower end face thereof and extending in the circumferential direction of the fixing member 80. These cutouts 86 give additional area for ensuring a fluid communication of the end of the orifice passage 84 with the equilibrium chamber 82. For assuring an efficiency of assembling of the outer fixing member 80 with respect to the second mounting member 14, the pair of cutouts 86 are formed at respective circumferential positions which are opposed to each other a diametrical direction of the outer fixing member 80, in the present embodiment. It should be appreciated that these cutouts 86 can be eliminated as long as the fluid communication of the orifice passage 84 with the equilibrium chamber 82 is assured.

In the engine mount 10 constructed as described above, a fluid pressure difference between the pressure receiving chamber 75 and the equilibrium chamber 82 is induced upon application of a vibrational load between the first and second mounting members 12, 14. Since the pressure receiving chamber 75 and the equilibrium chamber 82 are held in fluid communication with each other through the orifice passage 84, the fluid pressure difference between the pressure receiving chamber 75 and the equilibrium chamber 82 causes flows of the fluid between two chambers 75, 82 through the orifice passage 84. As a result, the engine mount 10 of the present invention exhibits an excellent damping effect with respect to the input vibration on the basis of the flows of the fluid through the orifice passage 84. Preferably, the orifice passage 84 is tuned to a frequency band lower than the frequency band to which the restricting fluid passage 71 and the movable rubber plate 66 are tuned. In the present embodiment, the orifice passage 84 is tuned so that flows or resonance of the fluid flowing through the orifice passage 84 exhibit an high vibration damping effect with respect to low frequency vibrations such as an engine shake.

For manufacturing the engine mount 10 constructed as described above, it may be possible that the orifice member 40, the integral vulcanized assembly 38 and the elastic rubber layer 76 are formed independently of each other, and then these independent components 40, 38, 76 are sequentially assembled with respect to the second mounting member 14 in the order of the description. Alternatively, it may be possible that the integral vulcanized assembly 38, the orifice member 40 and the elastic rubber layer 76 are assembled together in advance, and then the assembled components 38, 40, 76 are assembled with the second mounting member 14.

The above-described assembling of the components 38, 40, 76 with the second mounting member 14 is effected within a mass of the non-compressible fluid, for example, so that the pressure-receiving chamber 75 and the equilibrium chamber 82 are filled with the fluid. Described in detail, the integral vulcanized assembly 38, the orifice member 40 and the elastic rubber layer 76 are assembled together in the atmosphere to obtain an intermediate assembly, and an assembling of this intermediate assembly with the second mounting member 14 is effective within the mass of the non-compressible fluid. The assembling of the orifice member 40 with the integral vulcanized assembly 38 may possible be effected in the mass of the non-compressible fluid, for facilitating air bleeding from the orifice passage 84.

For installing the engine mount 10 constructed as described above on the vehicle, a stop member 88 is fixed to the first mounting member 12 and a cylindrical bracket 90 is fixed to the second mounting member 14. The stop member 88 is a metallic disk-like member having a fixing bore 92 formed through a central portion thereof. The fixing protrusion 18 of the first mounting member 12 is press-fitted into the fixing bore 92 of the stop member 88, so that the stop member 88 is firmly fixed to an axially upper end portion of the first mounting member 12 so as to extend in a radial direction perpendicular to the axis of the first mounting member 12. A rubber buffer 94 is bonded to an outer peripheral portion of an lower end face of the stop member 88 so as to extend axially downwardly, upon vulcanization of a rubber material for forming the rubber buffer 94. Upon installation of the engine mount 10 on the vehicle, the power unit of the vehicle (not shown) is superposed on the stop member 88, and the power unit and the first mounting member 12 are fastened by means of the stud 22 of the first mounting member 12, so that the first mounting member 12 is firmly fixed to the power unit of the vehicle.

On the other hand, the cylindrical bracket 90 includes a large diameter cylindrical wall portion 96 into which the second mounting member 14 is press-fitted. The cylindrical bracket 90 further includes a fixing plate portion 98 integrally formed at an axially lower end portion of the cylindrical wall portion 96 and extending in a radial direction perpendicular to an axial direction of the cylindrical bracket 90. Upon installation of the engine mount 10 on the vehicle, the fixing plate portion 98 is superposed on and bolted to the body of the vehicle (not shown) by bolts extending through threaded holes 99, so that the second mounting member 14 is firmly fixed to the body of the vehicle via the cylindrical bracket 90. The cylindrical bracket 90 yet further includes an abutting portion 100 integrally formed at an axially upper open end portion thereof so as to extend inwardly in the radial direction perpendicular to its axial direction. This abutting portion 100 is opposed to an outer peripheral portion of the stop member 88 fixed to the first mounting member 12 in the axial direction of the engine mount 10 with a given axial spacing therebetween. The stop member 88 and the abutting portion 100 cooperate to form a stop mechanism for limiting an amount of deformation of the elastic body 16, by abutting contact of the stop member 88 and the abutting portion 100 with each other via the rubber buffer 94, upon application of an excessively large vibrational load in a bound direction in which the first and second mounting member 12, 14 are moved toward each other.

Figure 11:
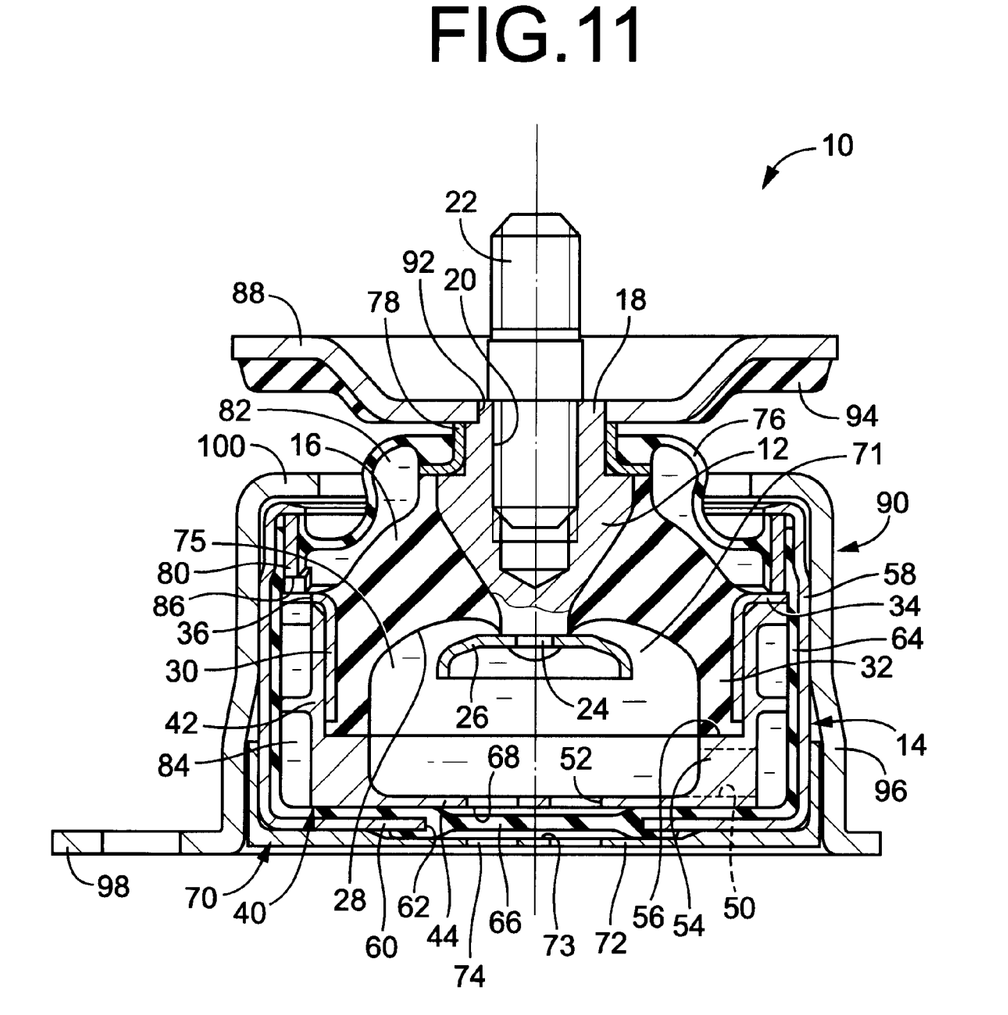
FIG. 11 is a view corresponding to FIG. 1 in which the engine mount of FIG. 1 is installed on the vehicle.

With this engine mount 10 installed on the vehicle as described above, a static load or weight of the power unit acts between the first and second mounting member 12, 14, so that the elastic body 16 is elastically deformed by a given amount with the static load acting thereon in a static state of the engine mount 10 as show in FIG. 11.

In the engine mount 10 constructed according to the first embodiment as described above, the equilibrium chamber 82 is formed on the outside of the elastic body 16, and only the pressure receiving chamber 75 is interposed between the first and second mounting members 12, 14. This arrangement makes it possible to reduce a size of the engine mount 10 in the axial direction of the engine mount 10. For instance, JP-A-7-54131, JP-A-7-56314 and JP-A-8-14311 disclose one type of conventional fluid-filled vibration damping device in which the pressure receiving chamber and the equilibrium chamber are arranged in series in the axial direction of the engine mount. In comparison with these conventional fluid-filled vibration damping devices, the engine mount 10 enjoy advantages such as a reduced space needing for installation thereof on the vehicle, and a minimized distance between a fixing portion at which the entire mount 10 is fixed to the body of the vehicle and an elastic support center of the engine mount 10 in the axial direction of the engine mount 10.

In the engine mount 10, the orifice passage 84 is partially defined by the orifice member 40 and formed by disposing the orifice member 40 interposed between the outer circumferential surface of the elastic body 16 and the inner cylindrical surface of the cylindrical wall portion 58 of the second mounting member 14. This arrangement ensures a high degree of freedom in designing the shape of the orifice passage 84 including the length or the cross sectional area of the orifice passage 84. The orifice member 40 can be arranged in the second mounting member 14 with improved space utilization and without needing enlarging the overall size of the engine mount 10.

In particular, the axially lower end portion of the orifice member 40 protrudes radially inwardly to form the annular protrusion 54, and the outer peripheral portion of the elastic body 16 is pressed onto the upper surface of the annular protrusion 54 (i.e., sealing abutting surface 56) over its entire circumference. This arrangement makes it possible to prevent the fluid flowing through a clearance formed between the elastic body 16 and the orifice member 40, which causes undesirable shortening of the orifice passage 48, with a simple structure. Thus, the engine mount 10 exhibits a desired vibration damping effect with high stability.

In the present embodiment, the orifice member 40 is the cup-shaped member, and the bottom wall portion 44 of the orifice member 40 is utilized to serve as a stop member for limiting an amount of elastic deformation of the elastic rubber layer 76 in a direction toward the pressure receiving chamber 75. Therefore, the present engine mount 10 is provided with such a stop member with a simple structure and a reduced number of components. While the orifice member 40 has the fluid communication holes 52 formed through the bottom wall portion 44 thereof, the length or the cross sectional area of the fluid communication holes 52 is desirably determined so that the engine mount 10 is able to exhibit a desired vibration damping effect with respect to vibration within another frequency range, on the basis of resonance of the fluid flowing through the fluid communication holes 52.

Further, the communication passage 50 and the opening 48 for connecting the opposite ends of the orifice passage 84 to the pressure receiving chamber 75 and the equilibrium chamber 82, respectively, are both formed in the orifice member 40. This arrangement eliminates a need for positioning of the orifice member 40 relative to the integral vulcanized assembly 38 and the second mounting member 14 in the circumferential direction thereof, upon assembling the orifice member 40 to the integral vulcanized assembly 38 and the second mounting member 14. This results in an excellent manufacturing efficiency of the orifice passage 84.

While the presently preferred embodiment of the invention has been described above for illustrative purpose only, it is to be understood that the invention is not limited to the details of the illustrated embodiment.

In the illustrated embodiment, only the open end portion of the cylindrical wall portion 58 of the second mounting member 14 is subjected to a drawing operation to reduce a diameter thereof. Such a drawing operation may be performed on a more wide area or an entire area of the cylindrical wall portion 58, for example. In this case, the cylindrical wall portion 58 of the second mounting member 14 is forcedly pressed onto the outer circumferential surfaces of the outward flange portion 34 and the orifice member 40.

A configuration of the orifice passage 84 partially defined by the orifice member 40 is not particularly limited to the illustrated embodiment, but may be suitably changed depending upon a required vibration damping characteristics or the like. For instance, the orifice member 40 may be arranged to have a groove having a rectangular shape in its cross section and open in the inner circumferential surface thereof. The opening of the groove is closed by the outer metal sleeve 30, to thereby form an orifice passage extending in the inner circumferential portion of the orifice member 40. Further, the communication passage for permitting a fluid communication of the one end of the orifice passage 84 with the pressure receiving chamber 75 may be formed in the annular protrusion 54 so as to open in the upper surface of the annular protrusion 54, or alternatively may be formed as a groove open in the axially lower surface of the annular protrusion 54 and extending in the radial direction thereof.

While the elastic rubber layer 76 is fixed at its inner peripheral portion to the first mounting member 12 via the inner fixing member 78 in the illustrated embodiment, the inner peripheral portion of the elastic rubber layer 76 may be directly bonded to the first mounting member 12 in the process of vulcanization of a rubber material for forming the elastic rubber layer 76. In this case, the elastic rubber layer 76 may possibly be formed integrally with the elastic body 16.

The hat-shaped member 26 and the movable rubber plate 66 formed in the pressure receiving chamber 75 is not essential to practice the present invention, but may optionally be employed taking into account a required vibration damping characteristic of the mount, or the like.

It is also to be understood that the present invention may be embodied with various other changes, modification and improvements, which may occur to those skilled in the art, without departing from the spirit and scope of the invention defined in the following claims.

What is claimed is:

1. A fluid-filled vibration damping device comprising:
   a first mounting member;
   a second mounting member having a generally cup shape and being opposed at an open end portion to said first mounting member with a given spacing therebetween;
   an elastic body interposed between and elastically connecting said first and second mounting members such that said open end portion of the second mounting member is fluid-tightly closed by said elastic body;

a pressure receiving chamber partially defined by said elastic body and formed within said second mounting member on one of opposite sides of said elastic body, said pressure receiving chamber being filled with a non-compressible fluid;

an elastic rubber layer extending between said first and second mounting members and disposed outward of the elastic body with a spacing therebetween;

an equilibrium chamber partially defined by said elastic rubber layer and formed on an other one of said opposite sides of said elastic body, said equilibrium chamber being filled with said non-compressible fluid;

an outer circumferential metallic sleeve having a generally cylindrical shape and bonded to an outer circumferential surface of said elastic body upon vulcanizing a rubber material for forming said elastic body, said outer circumferential metallic sleeve including an outward flange portion integrally formed at one of axially opposite ends thereof located on a side of said open end portion of said second mounting member, so as to extend radially outwardly;

a cylindrical orifice member disposed radially outwardly on said outer circumferential metallic sleeve with one of axially opposite end faces thereof superposed on one of axially, opposite surfaces of said outward flange portion of said outer circumferential metallic sleeve which is remote from said open end portion of said second mounting member, said orifice member together with said outer circumferential metallic sleeve being fitted into a cylindrical wall portion of said second mounting member so that said orifice member is interposed between said outer circumferential metallic sleeve and said cylindrical wall portion of said second mounting member to define therebetween an orifice passage for fluid communication between said pressure receiving chamber and said equilibrium chamber;

an outer metallic ring bonded to an outer peripheral portion of said elastic rubber layer upon vulcanization of a rubber material for forming said elastic rubber layer, said outer metallic ring being superposed on an other one of said axially opposite surfaces of said outward flange portion of said outer circumferential metallic sleeve, while being fixedly fitted into said cylindrical wall portion of said second mounting member.

2. A fluid-filled vibration damping device according to claim 1, wherein said orifice member is superposed at an other one of said axially opposite end faces thereof on a side of a bottom wall portion of said second mounting member, and includes an annular protrusion integrally formed at said other one of said axially opposite end faces thereof so as to protrude radially inwardly, wherein said elastic body is held in abutting contact at an end face of an outer peripheral portion thereof on said annular protrusion, and wherein said annular protrusion is formed with a first communication passage through which one of opposite ends of said orifice passage is held in fluid communication with said pressure receiving chamber.

3. A fluid-filled vibration damping device according to claim 2, wherein said first communication passage has a tunnel form extending through said annular protrusion or a groove form open to said bottom surface of said second mounting member, and said outer circumferential metallic sleeve is fluid-tightly superposed on said annular protrusion over an entire circumference thereof in an axial direction thereof with said elastic body interposed therebetween.

4. A fluid-filled vibration damping device according to claim 1, wherein said orifice member includes a first communication passage for fluid communication of one of opposite ends of said orifice passage with said pressure receiving chamber, and a second communication passage for fluid communication of an other one of said opposite ends of said orifice passage with said equilibrium chamber.

5. A fluid-filled vibration damping device according to claim 4, wherein said outward flange portion of said outer circumferential metallic sleeve has a plurality of windows formed therethrough and spaced apart from each other in a circumferential direction thereof, such that said second communication passage is held in fluid communication with said equilibrium chamber through any one of said windows, irrespective of a circumferential position of said orifice member relative to said outer circumferential metallic sleeve.

6. A fluid-filled vibration damping device according to claim 5, wherein said outer metallic ring superposed on said other one of said axially opposite surfaces of said outward flange portion of said outer circumferential metallic sleeve has a pair of cutouts open in one of axially opposite end faces thereof which is held in contact with said outward flange portion, said pair of cutouts extend in a circumferential direction of said outer metallic ring and opposed to each other in a diametric direction of said outer metallic ring.

7. A fluid-filled vibration damping device according to claim 1, wherein a bottom wall portion of said second mounting member includes a through hole and a movable rubber plate is elastically deformably disposed in said through hole such that the through hole is fluid tightly closed by said movable rubber plate.

8. A fluid-filled vibration damping device according to claim 7, wherein said one of axially opposite ends of said orifice member on a side of said bottom wall portion of said second mounting member extends radially inwardly so as to form a stop portion having at least one through hole, said stop portion being located axially inward of said movable rubber plate with a given axial spacing therebetween, so as to limit an amount of displacement of said movable rubber plate in a direction toward an inside of said pressure receiving chamber.

9. A fluid-filled vibration damping device according to claim 7, further comprising:

a covering member superposed on said bottom wall portion of said second mounting member and fixed onto said cylindrical wall portion of said second mounting member, so as to form a protecting part having an air hole and located axially outward of said movable rubber plate with an axial spacing therebetween, said protecting part being adapted to limit an amount of displacement of said movable rubber plate in a direction away from said pressure receiving chamber.

10. A fluid-filled vibration damping device according to claim 1, wherein said orifice member includes a circumferential groove open in an outer circumferential surface thereof, and an opening of said circumferential groove is closed by said cylindrical wall portion of said second mounting member, to thereby form said orifice passage.

11. A fluid-filled vibration damping device according to claim 1, further comprising an inner metallic ring bonded to an inner peripheral portion of the elastic rubber layer upon vulcanizing a rubber material for forming said elastic rubber layer, said inner metallic ring is fixedly fitted onto said first mounting member.

12. A fluid-filled vibration damping device according to claim 1, further comprising a restricting member which is supported by said first mounting member and disposed within said pressure receiving chamber such that said restricting member cooperates with said elastic body to form therebetween a restricting fluid passage.

13. A fluid-filled vibration damping device according to claim 1, further comprising a stop member formed on a side of said first mounting member and an abutting portion formed on a side of said second mounting member, said stop member and said abutting portion cooperating to form a stop mechanism for limiting an amount of deformation of said elastic body by abutting contact of said stop member and said abutting portion in a direction in which said first and second mounting member are moved toward each other.

14. A fluid-filled vibration damping device according to claim 1, further comprising:
  a movable rubber plate partially defining said pressure receiving chamber and being elastically deformable due to a pressure change of said non-compressible fluid in said pressure receiving chamber; and
  a restricting member supported by said first mounting member and disposed within said pressure receiving chamber such that said restricting member cooperates with said elastic body to form therebetween a restricting fluid passage,
  wherein said vibration damping device is applicable as an engine mount of an automotive vehicle, and
  wherein said orifice passage is tuned to exhibit a vibration damping effect with respect to low frequency vibrations corresponding to engine shakes on the basis of flows of said non-compressible fluid flowing therethrough, and said movable rubber plate is tuned to exhibit a vibration isolating effect with respect to high frequency vibrations corresponding to engine idling vibrations on the basis of elastic deformation thereof, while said restricting fluid passage is tuned to exhibit a vibration isolating effect with respect to more higher frequency vibrations corresponding to intermediate and higher-speed booming noises on the basis of flows of said non-compressible fluid flowing therethrough.

15. A method of producing a fluid-filled vibration damping device comprising: a first mounting member; a second mounting member having a generally cup shape and being opposed at an open end portion to said first mounting member with a given spacing therebetween; an elastic body interposed between and elastically connecting said first and second mounting members such that said open end portion of the second mounting member is fluid-tightly closed by said elastic body; a pressure receiving chamber partially defined by said elastic body and formed within said second mounting member on one of opposite sides of said elastic body, said pressure receiving chamber being filled with a non-compressible fluid; an elastic rubber layer extending between said first and second mounting members and disposed outward of said elastic body with a spacing therebetween; an equilibrium chamber partially defined by said elastic rubber layer and formed on an other one of said opposite sides of said elastic body, said equilibrium chamber being filled with said non-compressible fluid; an outer circumferential metallic sleeve having a generally cylindrical shape and bonded to an outer circumferential surface of said elastic body upon vulcanizing a rubber material for forming said elastic body, said outer circumferential metallic sleeve including an outward flange portion integrally formed at one of axially opposite ends thereof located on a side of said open end portion of said second mounting member, so as to extend radially outwardly; a cylindrical orifice member disposed radially outwardly on said outer circumferential metallic sleeve with one of axially opposite end faces thereof superposed on one of axially opposite surfaces of said outward flange portion of said outer circumferential metallic sleeve which is remote from said open end portion of said second mounting member, said orifice member together with said outer circumferential metallic sleeve being fitted into a cylindrical wall portion of said second mounting member so that said orifice member is interposed between said outer circumferential metallic sleeve and said cylindrical wall portion of said second mounting member to define therebetween an orifice passage for fluid communication between said pressure receiving chamber and said equilibrium chamber; and an outer metallic ring bonded to an outer peripheral portion of said elastic rubber layer upon vulcanization of a rubber material for forming said elastic rubber layer, said outer metallic ring being superposed on an other one of said axially opposite surfaces of said outward flange portion of said outer circumferential metallic sleeve, while being fixedly fitted into said cylindrical wall portion of said second mounting member, said method comprising the steps of:
  press-fitting said outer circumferential metallic sleeve bonded to said outer circumferential surface of said elastic body to which the first mounting member is bonded and said orifice member into said cylindrical wall portion of said second mounting member;
  press-fitting said outer metallic ring bonded to said elastic rubber layer into said cylindrical wall portion of said second mounting member such that said outer metallic ring is superposed on said orifice member and said outward flange portion of said outer circumferential metallic sleeve in an axial direction thereof; and then
  radially inwardly drawing an open end portion of said cylindrical wall portion of said second mounting member so that said outer metallic ring is firmly fitted into said cylindrical wall portion of said second mounting member.

* * * * *